Dec. 13, 1966  G. L. MAYO  3,291,166
POWER SAW
Filed Dec. 21, 1964  3 Sheets-Sheet 1

INVENTOR.
GEORGE L. MAYO
BY
ATTORNEY.

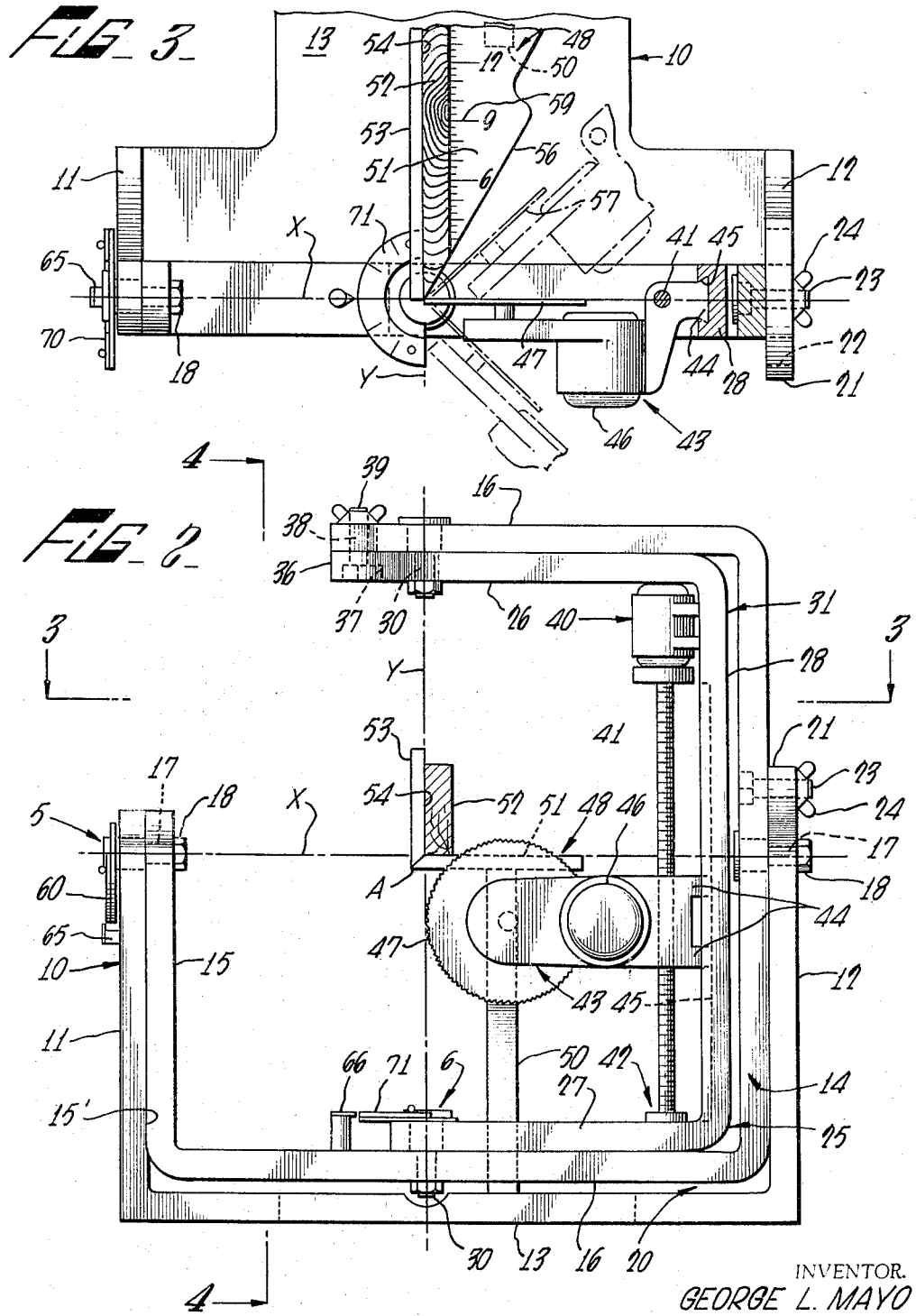

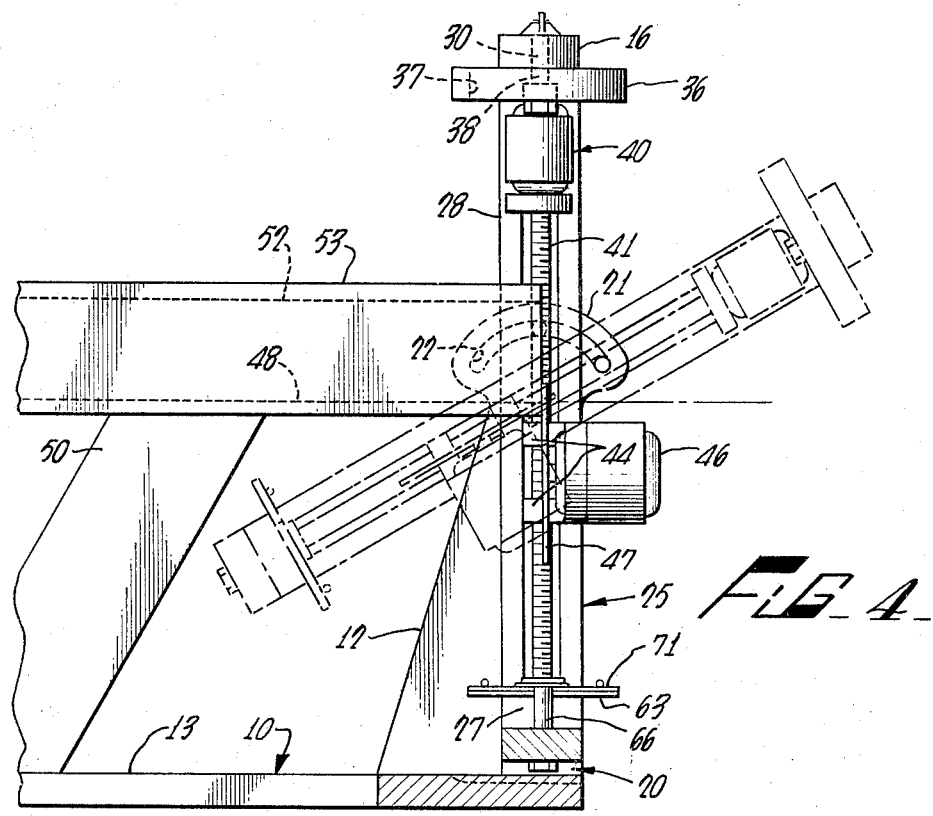
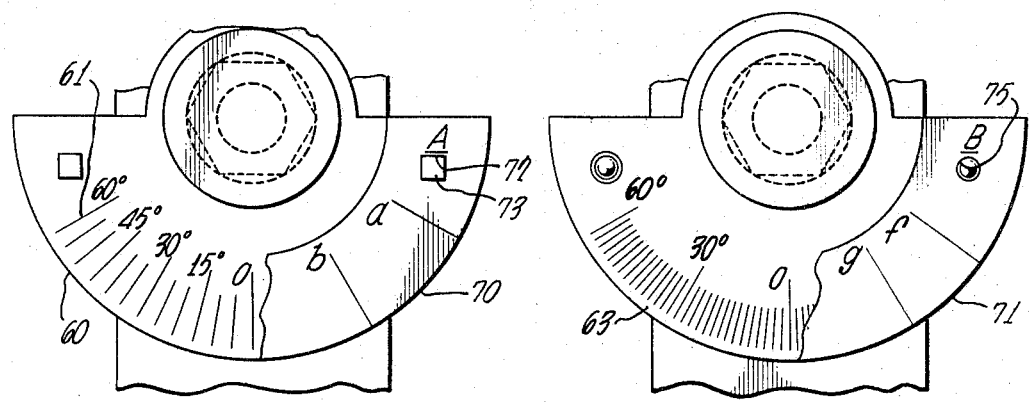
FIG. 4.
FIG. 5.   FIG. 6.
INVENTOR.
GEORGE L. MAYO
BY
ATTORNEY.

United States Patent Office 3,291,166
Patented Dec. 13, 1966

3,291,166
POWER SAW
George L. Mayo, Fort Worth, Tex., assignor to Clary Corporation, San Gabriel, Calif., a corporation of California
Filed Dec. 21, 1964, Ser. No. 419,734
14 Claims. (Cl. 143—6)

This invention relates to wood processing equipment and has particular reference to power saws for wood and similar material.

Radial arm type power saws are in widespread use at present, principally because the workpiece to be cut may be held stationary and the rotating saw blade moved relative thereto during the cutting operation. Also, the saw blade may be readily set to make various simple or compound angle cuts. Thus, such saws present certain advantages over the usual bench saws wherein the workpiece must be moved relative to the saw blade during the cutting operation.

However, a principal difficulty experienced with radial arm saws is that any angular adjustment of the saw blade about either a vertical or horizontal axis results in a movement of such blade relative to the workpiece. Since the position of the cut is thus changed in accordance with the angular setting of the saw blade, it is necessary to mark the position of the cut, and after the saw blade has been angularly adjusted to the desired position, to locate the mark in correct position relative to the saw blade. This is not only time consuming but is subject to errors in measurement or alignment of the workpiece relative to the saw blade.

A principal object of the present invention is to obviate the above noted difficulties.

Another object is to provide a power saw of the above type whose saw blade may be angularly adjusted relative to a preset workpiece without changing the lengthwise dimension of such workpiece.

Another object is to provide a power saw wherein a workpiece may be located in proper position relative to a fixed measuring scale and the saw blade adjusted to any desired angular position without requiring changing of the position of the workpiece.

Another object is to facilitate setting of a power saw blade to a predetermined angular position.

Another object is to facilitate angular setting of a power saw blade in accordance with pre-prescribed directions.

The manner in which the above and other objects of the invention are accomplished will be readily understood on reference to the following specification when read in conjunction with the accompanying drawings, wherein:

FIG. 2 is a front elevational view of the invention as illustrated in FIG. 1.

FIG. 3 is an elevational plan view, partly in section, and is taken substantially along the line 3—3 of FIG. 2.

FIG. 4 is a side elevational view, partly in section, and is taken along the line 4—4 of FIG. 2.

FIG. 5 is a front fragmented view of the scale and template for determining the angular positioning of the saw blade about a horizontal axis and is taken in the direction of arrow 5 in FIG. 2.

FIG. 6 is a view similar to that of FIG. 5 showing the scale and template for determining the angular positioning of the saw blade about a vertical axis and is taken in the direction of the arrow 6 in FIG. 2.

Figure 1:
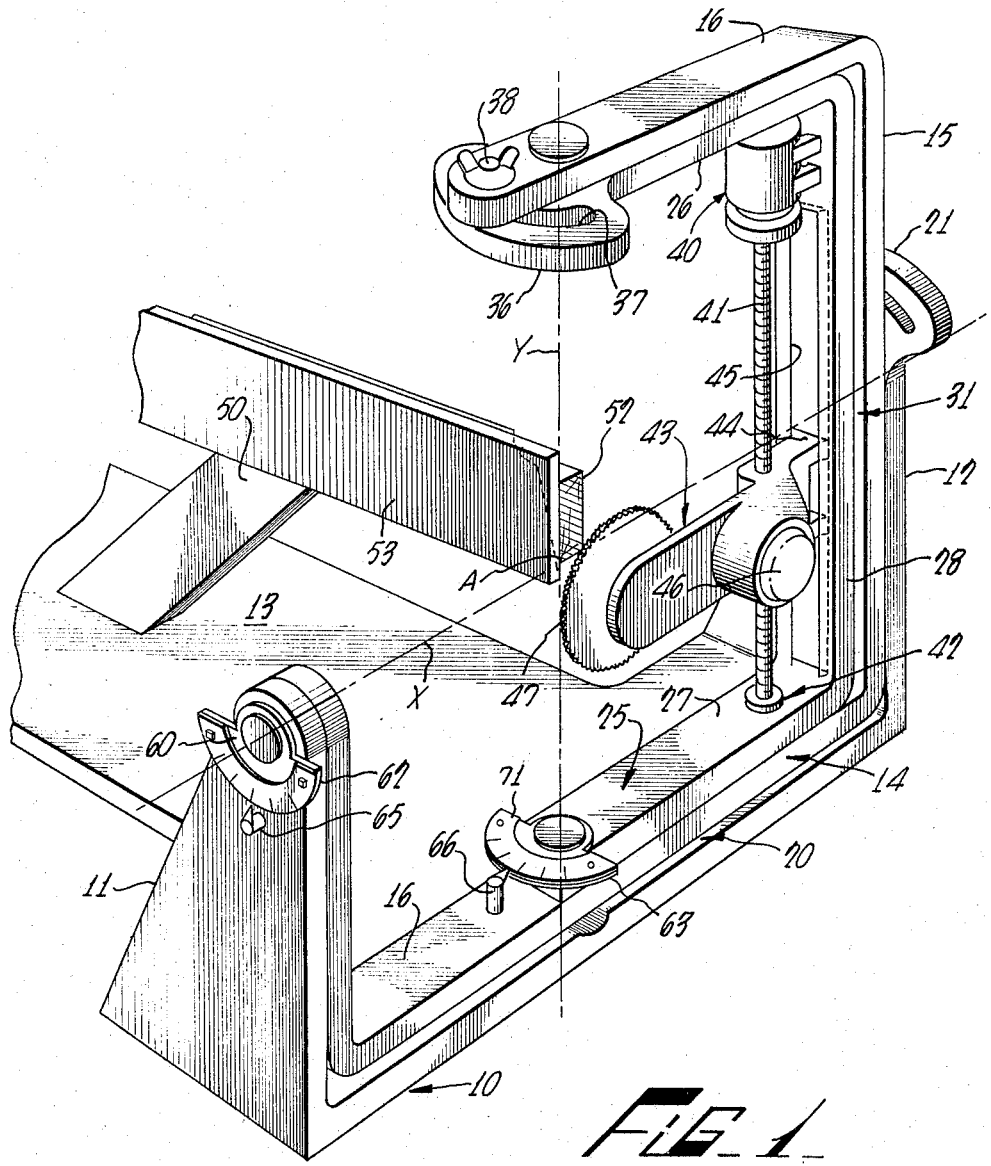
FIG. 1 is a perspective view of a preferred form of the present invention.

With reference to the drawings, the saw in general can be seen to be supported by a stationary base member 10 which comprises a pair of integrally formed upstanding arm extensions 11 and 12 and a base plate 13. In FIG. 2, there elements together are shown to have a generally U-shaped configuration and reference is now directed to this figure.

Pivotally mounted between the upstanding arms 11 and 12 is a substantially rectangularly shaped frame member 14 which comprises a first pair of vertical extensions 15 and a second pair of horizontal extensions 16, all formed integrally together as one unit. The frame 14 is pivotally supported by a pair of pivot elements 17, both of which pass through the vertical extensions 15 and through the upstanding arm extensions 11 and 12 of the base member 10.

The pivot elements 17 are in axial alignment with one another to pivotally support the frame member 14 for movement about a horizontal pivot axis, indicated at X. A gap 20 is shown between the base member 13 and the lower horizontal extension of the frame member 14 to permit pivoting of the latter.

The upper end of extension 12 terminates above the pivot member 17 in a flared end portion 21. As best seen in FIG. 4, this flared portion bears a curved slot 22 therethrough which is concentric with the pivot axis X and has a bolt 23 extending therethrough. The head of bolt 23 is bedded within the vertical extension 15 of frame 14 and its opposite end is threadably engaged with a thumb nut 24.

From the above description, it becomes apparent that when it is desired to angularly adjust frame 14 from its full line position shown, the nut 24 is released, allowing frame 14 to be pivoted about its horizontal axis X into any desired position.

Pivotally mounted between the horizontal extensions 15 of frame 14 is a second frame member 25, generally U-shaped in configuration and comprising upper and lower horizontal arms or extensions 26 and 27, respectively. The latter are formed integrally with a vertical extension 28 and are pivotally mounted in the frame 14 for movement about a pivot axis Y. For this purpose, a pair of axially aligned pivot elements 30 extend through the extensions 16 of frame 14 and through the horizontal extensions 26 and 27 of frame 25.

It will be noted that the Y axis is located in the same plane as the X axis but perpendicular thereto, such axes intersecting each other at A.

The outer end of the upper horizontal arm 26 is flared outwardly in the same manner as the end portion 21 of arm 12 and is provided with a curved slot 37 which is concentric with the bearing member 30. A clamp bolt 38 extends through the slot 37 and through a hole in the extension 16. The bolt 38 may, by means of a thumb nut 39, clamp the frame 25 in different angular positions about the axis Y.

A reversible electric motor 40 suitably attached to the frame 25 is provided to drive a threaded shaft 41 which is rotatably supported at its lower end in a bearing 42 formed in the lower extension 26 of the frame 25. The shaft is threaded through a sawblade carriage 43 which has a pair of dovetail shoes 44 slideable along a mated dovetail groove 45 formed in the vertical extension 28 of the frame 25.

A motor 46 is mounted within the carriage 43 and is suitably geared to a circular saw blade 47, also rotatably supported by the carriage 43.

The periphery of blade 47 is preferably tangent to the axis Y and the blade is so located that the axes X and Y lie in the plane of its surface which is remote from the motor 46, as viewed in FIG. 3. Thus, the frame 25 may be swung in either direction from its full line position shown in FIG. 3 while maintaining the plane of the aforementioned surface of the saw blade coincident with the axis Y.

Likewise, the frame 14 may be swung in either direction from its full line position shown in FIG. 4 while maintaining the plane of such aforementioned surface of the saw blade coincident with the axis X.

A horizontal L-shaped workpiece support, generally indicated at 48, is supported from the base 13 by brackets, one of which is shown at 50. The support 48 comprises a horizontal guide 51 and a vertical guide 53, whose guiding surfaces lie coincident with the axes X and Y respectively when viewed in FIG. 2. Accordingly, the guiding surfaces intersect along a line coincident with the point of intersection A of such axes X and Y.

The diameter of the blade 47 may be enlarged to overlap the axis Y. However, in this case, the guides 51 and 53 would have to be cut back to permit swinging movement of the blade.

A linear scale 59 is formed along the length of the horizontal guide piece 51 and is laid out in appropriate units of linear measurement starting from the X axis.

Accordingly, a workpiece may be readily positioned along this scale to a desired location indicative of its length to the point of intersection A and the angle of the cut may be adjusted as desired about either a horizontal or vertical axis or both without changing such dimension. This obviates the necessity of marking the position of the cut from the workpiece and then adjusting the position of the workpiece until such mark is aligned with the edge of the sawblade.

Means are provided for facilitating angular adjustment of the frames 14 and 25 in accordance with predescribed directions for making angular cuts on a workpiece. For this purpose, a plate 60 (see also FIG. 5) having a scale 61 thereon graduated in angular units is secured to one of the pivot elements at 18 and thus moves with the frame 14 relative to an index element 65 mounted on the upstanding arm 11. Likewise, a second plate 63 (see also FIG. 6) is secured to the frame 25 to move relative to an index element 66 mounted on the frame 14.

In lieu of the angular scales, i.e. 61, removable templates, partly shown at 70 and 71, may be used. The template 70 is provided with square holes 72 adapted to be snapped over similarly shaped studs 73 secured to the plate 60 to locate the template in place. The template 71 is provided with round holes 75 arranged to snap over similarly shaped studs extending from the plate 63. The differently shaped studs and holes insure that the templates are mounted on the proper respective plates.

Each template has indicia marked thereon. For example, the template 70 has marks *a* and *b*, whereas the template 71 has indicia marks *f* and *g* thereon.

A an example of the manner in which the saw may be quickly and readily set to cut pieces of different lengths and shape, consider a structure in which pieces are required 26½ inches long with the ends cut at prescribed compound angles. To facilitate setting of the saw and cutting of the pieces to the proper length, the two templates 70 and 71 would be furnished along with instructions to the workman. Such instructions would read:

(1) Set template A to *b* and template B to *f* and cut one end of piece.
(2) Set template A to *a* and template B to *g*. Set workpiece at 26½ inches and cut opposite end.

This arrangement relieves the workman of the necessity of figuring the proper angular setting of the saw and greatly reduces the possibility of error on his part. The saw is found to greatly increase the speed of production and also insures greater safety since the saw blade is traversed through its cutting operation by a motor drive, thereby leaving the workman free to hold the workpiece in place with two hands.

The motor 40 is preferably controlled by a suitable foot-operated switch (not shown).

Although the invention has been described in detail and certain specific terms and languages have been used, it is to be understood that the present disclosure is illustrative rather than restrictive and that changes and modifications may be made without departing from the spirit or scope of the invention as set forth in the claims appended thereto.

Having thus described the invention, what is desired to be secured by United States Letters Patent is:

1. In a power saw,
the combination of a base,
a first frame pivotally supported by said base for movement about a first axis,
a second frame pivotally supported by said first frame for movement about a second axis coplanar with and perpendicular to said first axis,
a rotary cutting member,
means on said second frame supporting said cutting member for movement along said second axis, and
means for supporting a workpiece in the path of movement of said cutting member.

2. In a power saw,
the combination of a base,
a first frame pivotally supported by said base for movement about a first axis,
a second frame pivotally supported by said first frame for movement about a second axis coplanar with and perpendicular to said first axis,
a rotary saw blade,
means on said second frame supporting said saw blade for movement along said second axis,
said axes extending in the plane of one surface of said saw blade, and
means for supporting a workpiece in the path of movement of said saw blade.

3. In a power saw,
the combination of a base,
a first frame pivotally supported by said base for movement about a first axis,
means for locking said first frame in different adjusted positions relative to said base,
a second frame pivotally supported by said first frame for movement about a second axis coplanar with and perpendicular to said first axis,
means for locking said second frame in different adjusted positions relative to said first frame,
a rotary cutting member,
means on said second frame supporting said cutting member for movement along said second axis, and
means for supporting a workpiece in the path of movement of said cutting member.

4. In a power saw,
the combination of a base,
a first frame pivotally supported by said base for movement about a first axis,
a second frame pivotally supported by said first frame for movement about a second axis coplanar with and perpendicular to said first axis,
a rotary cutting member having an outer periphery,
means on said second frame supporting said cutting member for movement parallel to said second axis,
said outer periphery of said cutting member extending at least substantially tangent to said second axis, and
means for supporting a workpiece in the path of movement of said cutting member.

5. In a power saw,
the combination of a base,
a first frame pivotally supported by said base for movement about a first axis,
a second frame pivotally supported by said first frame for movement about a second axis perpendicular to said first axis,
a cutting device including a rotary saw blade;
means on said second frame supporting said cutting device for movement therealong and parallel to said second axis, said second axis extending at least substantially in the plane of one side surface of said saw blade, and means for supporting a workpiece in the path of movement of said saw blade with two of the surfaces of said workpiece coincident with respective ones of said axes.

6. The combination according to claim 5 comprising motor means on said second frame for moving said cutting member along said second axis.

7. In a power saw,
the combination of a base,
a first generally U-shape frame,
means on said base pivotally supporting the legs of said frame for movement about a first axis,
a second generally U-shape frame,
means on said first frame pivotally supporting the legs of said second frame for movement about a second axis at right angles to said first axis,
a motor,
a rotary saw blade driven by said motor,
means on said second frame for guiding said motor parallel to said second axis and between the legs of said second frame, and
means for supporting a workpiece between the legs of said frames and in the path of movement of said saw blade.

8. The combination according to claim 7 wherein the periphery of said saw blade lies tangent to said second axis.

9. In a power saw,
the combination of a base,
a first generally U-shape frame,
means on said base pivotally supporting the legs of said frame for movement about a first axis,
a second generally U-shape frame,
means on said first frame pivotally supporting the legs of said second frame for movement about a second axis at right angles to said first axis,
a carriage movable along said second frame in a direction parallel to said second axis and between the legs of said second frame,
means including a motor for moving said carriage along said second frame,
a second motor supported by said carriage,
a rotary saw blade driven by said second motor,
said second axis extending at least substantially in the plane of one surface of said saw blade, and
means for supporting a workpiece between the legs of said frames and in the path of movement of said saw blade.

10. The combination according to claim 9 wherein said axes extend in the plane to one surface of said saw blade.

11. The combination according to claim 9 wherein said supporting means is effective to support said workpiece with one surface coincident with said first axis and another surface coincident with said second axis.

12. In a power saw,
the combination of a base,
a first generally U-shape frame,
means on said base pivotally supporting the legs of said frame for movement about a first axis,
means for locking said first frame in different adjusted positions relative to said base,
a second generally U-shape frame,
means on said first frame pivotally supporting the legs of said second frame for movement about a second axis at right angles to said first axis,
means for locking said second frame in different adjusted positions relative to said first frame,
a rotary cutting member,
means on said second frame for guiding said cutting member along said second axis and between the legs of said second frame, and
means for supporting a workpiece in the path of movement of said cutting member.

13. In a power saw,
the combination of a base,
a first generally U-shaped frame,
means on said base pivotally supporting the legs of said frame for movement about a first axis,
means for maintaining said first frame in different adjusted positions relative to said base,
a second generally U-shaped frame,
means on said first frame pivotally supporting the legs of said second frame for movement about a second axis at right angles to said first axis,
means for maintaining said second frame in different adjusted positions relative to said first frame,
a rotary saw blade,
means on said second frame for guiding said saw blade along said second axis between the legs of said second frame,
a workpiece support carried by said base, and
a linear tape on said support for indicating the length of a workpiece.

14. The combination according to claim 13 wherein said workpiece support comprises a horizontal workpiece guide whose guide surface lies in a plane coincident with said first axis and a vertical guide whose guide surface lies in a plane coincident with said second axis.

References Cited by the Examiner
UNITED STATES PATENTS

| | | | |
|---|---|---|---|
| 2,604,019 | 7/1952 | Malnar | 90—17 |
| 2,930,415 | 3/1960 | Cravens. | |
| 3,004,477 | 10/1961 | Nielsen et al. | 90—15 |

WILLIAM W. DYER, Jr., *Primary Examiner.*

W. D. BRAY, *Assistant Examiner.*

UNITED STATES PATENT OFFICE
CERTIFICATE OF CORRECTION

Patent No. 3,291,166                            December 13, 1966

George L. Mayo

It is hereby certified that error appears in the above numbered patent requiring correction and that the said Letters Patent should read as corrected below.

Column 5, line 43, for "frame," read -- frame; --; line 52, for "to" read -- of --.

Signed and sealed this 19th day of September 1967.

(SEAL)
Attest:

ERNEST W. SWIDER                            EDWARD J. BRENNER
Attesting Officer                                   Commissioner of Patents